(12) United States Patent
Stanfield et al.

(10) Patent No.: US 10,068,402 B2
(45) Date of Patent: *Sep. 4, 2018

(54) UPGRADE KIT FOR AN IGNITION KEY AND METHODS

(71) Applicant: ZIPCAR, INC., Boston, MA (US)

(72) Inventors: John Stanfield, Burlingame, CA (US);
Eric D. Aeby, Burlingame, CA (US);
Michael Javault, Burlingame, CA (US); Clement Gires, Burlingame, CA (US); Brian Ng, Burlingame, CA (US)

(73) Assignee: Zipcar, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/461,754

(22) Filed: Aug. 18, 2014

(65) Prior Publication Data

US 2015/0145645 A1 May 28, 2015

Related U.S. Application Data

(63) Continuation of application No. 14/087,666, filed on Nov. 22, 2013, now Pat. No. 8,841,987.

(51) Int. Cl.
*G05B 19/00* (2006.01)
*G07C 9/00* (2006.01)

(52) U.S. Cl.
CPC ..... *G07C 9/00896* (2013.01); *G07C 9/00857* (2013.01); *G07C 9/00309* (2013.01); *G07C 2009/00476* (2013.01)

(58) Field of Classification Search
CPC ............ G07C 9/00309; G07C 9/00896; G07C 9/00857; G07C 2009/00476; G08B 21/24; G08B 21/182; H04W 4/028

USPC .................................... 340/5.61, 5.51; 701/2
See application file for complete search history.

(56) References Cited

U.S. PATENT DOCUMENTS

| 4,595,902 | A | * | 6/1986 | Proske | B60R 25/24 340/5.64 |
|---|---|---|---|---|---|
| 5,644,172 | A | * | 7/1997 | Hodges | B60R 25/04 180/287 |
| 6,203,181 | B1 | | 3/2001 | Gross | |
| 6,765,311 | B1 | * | 7/2004 | Labonde | E05B 19/0082 307/10.1 |
| 7,928,924 | B1 | * | 4/2011 | Hendrickson | H01Q 1/50 343/700 MS |
| 8,258,939 | B2 | | 9/2012 | Miller et al. | |
| 8,330,593 | B2 | | 12/2012 | Golenski | |
| 8,344,849 | B2 | | 1/2013 | Larsson et al. | |
| 2001/0003439 | A1 | | 6/2001 | Deline et al. | |
| 2002/0109582 | A1 | * | 8/2002 | Mooney | H02J 7/0045 340/5.65 |

(Continued)

*Primary Examiner* — Zhen Y Wu
(74) *Attorney, Agent, or Firm* — Wayne Edward Ramage; Baker Donelson

(57) ABSTRACT

One variation of an upgrade kit—for an ignition key corresponding to a vehicle and including an immobilizer transponder and a keyless entry transmitter—includes: a wireless jammer configured to interfere with wireless transmission from the immobilizer transponder; a wireless receiver configured to receive an unlock request from an external device; a relay configured to actuate the keyless entry transmitter to unlock a door of the vehicle in response to the unlock request; and an enclosure configured to contain the wireless receiver and a portion of the ignition key.

19 Claims, 6 Drawing Sheets

(56) References Cited

U.S. PATENT DOCUMENTS

| | | | |
|---|---|---|---|
| 2003/0204290 A1 | 10/2003 | Sadler et al. | |
| 2004/0073440 A1 | 4/2004 | Garbers et al. | |
| 2004/0135435 A1* | 7/2004 | Nelson | B60R 25/04 307/10.3 |
| 2005/0099275 A1* | 5/2005 | Kamdar | B60R 25/2009 340/426.18 |
| 2007/0200663 A1 | 8/2007 | White et al. | |
| 2008/0018730 A1 | 1/2008 | Roth | |
| 2008/0186130 A1* | 8/2008 | Trevino | G07C 9/00896 340/5.2 |
| 2008/0190526 A1* | 8/2008 | O'Shea | A45C 1/08 150/147 |
| 2008/0252412 A1 | 10/2008 | Larsson et al. | |
| 2010/0078475 A1 | 4/2010 | Lin et al. | |
| 2010/0105416 A1* | 4/2010 | Nadler | H04W 48/04 455/456.4 |
| 2010/0274570 A1* | 10/2010 | Proefke | B60L 11/1824 705/1.1 |
| 2011/0060480 A1* | 3/2011 | Mottla | G06Q 10/02 701/2 |
| 2011/0086632 A1* | 4/2011 | Turney | H04M 1/66 455/421 |
| 2011/0093306 A1 | 4/2011 | Nielsen et al. | |
| 2011/0098878 A1* | 4/2011 | Podolak | B60R 25/00 701/31.4 |
| 2011/0112969 A1 | 5/2011 | Zaid et al. | |
| 2011/0128118 A1 | 6/2011 | Gilleland et al. | |
| 2011/0166748 A1 | 7/2011 | Schneider et al. | |
| 2011/0285765 A1* | 11/2011 | Lamontagne | B41J 3/36 347/3 |
| 2012/0120000 A1* | 5/2012 | Lucic | G06F 1/1626 345/173 |
| 2012/0158244 A1* | 6/2012 | Talty | B60R 25/24 701/36 |
| 2012/0226910 A1* | 9/2012 | Hutzler | G06F 21/575 713/182 |
| 2012/0293330 A1* | 11/2012 | Grant | G08B 13/1427 340/568.8 |
| 2013/0062410 A1* | 3/2013 | Mitchell | G06K 13/0868 235/449 |
| 2013/0082820 A1* | 4/2013 | Tieman | G07C 9/00309 340/5.61 |
| 2013/0217332 A1* | 8/2013 | Altman | H04H 60/90 455/41.2 |
| 2013/0249266 A1* | 9/2013 | Fujii | B60N 2/0244 297/344.1 |
| 2013/0303075 A1* | 11/2013 | Smiley | H04K 3/415 455/1 |
| 2014/0176301 A1* | 6/2014 | Fernandez Banares | G07C 9/00015 340/5.26 |
| 2015/0087241 A1* | 3/2015 | Van Wiemeersch | H04K 3/22 455/67.13 |

* cited by examiner

UPGRADE KIT FOR AN IGNITION KEY AND METHODS

CROSS-REFERENCE TO RELATED APPLICATIONS

This application is a continuation of co-pending U.S. patent application Ser. No. 14/087,666, filed 22 Nov. 2013, which is incorporated in its entirety by this reference.

This application is related to U.S. patent application Ser. No. 13/788,836, filed on 7 Mar. 2013, which is incorporated in its entirety by this reference.

TECHNICAL FIELD

This invention relates generally to the field of vehicle rentals and more specifically to a new and useful upgrade kit for an ignition key and methods for renting a vehicle in the field of vehicle rentals.

DESCRIPTION OF THE PREFERRED EMBODIMENTS

The following description of embodiments of the invention is not intended to limit the invention to these embodiments, but rather to enable any person skilled in the art to make and use this invention.

1. Upgrade Kit and Applications

Figure 1:
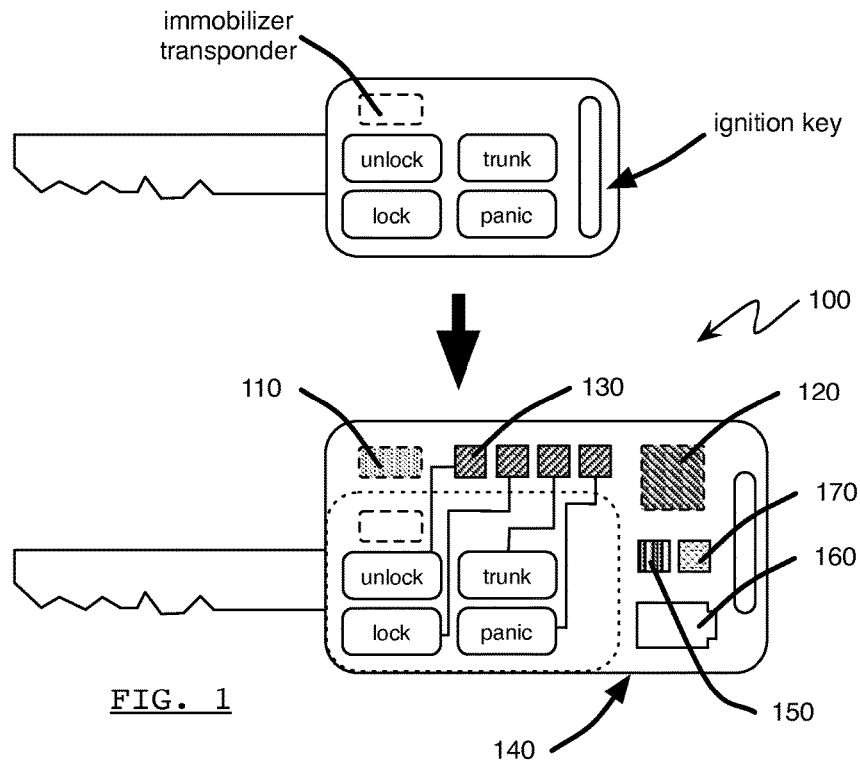
FIG. 1 is a schematic representation of an upgrade kit of a first embodiment of the invention.

As shown in FIG. 1, an upgrade kit 100 for an ignition key corresponding to a vehicle and including an immobilizer transponder and a keyless entry transmitter, the upgrade kit 100 including: a wireless jammer 110 configured to interfere with wireless transmission from the immobilizer transponder; a wireless receiver 120 configured to receive an unlock request from an external device; a relay 130 configured to actuate the keyless entry transmitter to unlock a door of the vehicle in response to the unlock request; and an enclosure 140 configured to contain the wireless receiver 120 and a portion of the ignition key.

Generally, the upgrade kit 100 can be installed in and/or coupled to an original equipment manufacturer (OEM) ignition key for a vehicle, such as a commercial or passenger automobile, to enable access to a corresponding vehicle through an external device that communicates vehicle with the ignition key. The upgrade kit 100 functions to expand communication and security features of an existing ignition key such that a user can communicate with the ignition key through a mobile computing device (e.g., a smartphone) or a wireless-enabled identification card to access the corresponding vehicle. In particular, once the upgrade kit 100 is installed in an ignition key, the upgraded ignition key can enable universal access to the corresponding vehicle through an authorized mobile computing device to rent or lease the vehicle to a user and without costly and/or vehicle make-and/or model-specific equipment requiring time-intensive installation into the vehicle itself. Rather, one of a pair of existing keys can be retrofitted with the upgrade kit 100 offsite while a vehicle owner or associate continues to operate the vehicle with the remaining key. Once the upgraded ignition key is returned, the vehicle can be immediately ready for sharing with (i.e., lease or rental to) another user.

Ignition keys for modern vehicle commonly incorporate an immobilizer transponder that communicates a digital key to a corresponding vehicle, a blade that engages an ignition key receptacle within the vehicle, a variety of access control regions (e.g., lock, unlock, and panic "buttons"), and a wireless transmitter that transmits commands corresponding to access control region selections to control access to the vehicle. The upgrade kit 100 can define a universal kit installable in ignition keys of a variety of existing and future vehicle makes and models to convert the corresponding vehicles into vehicles that can be shared with various users through their smartphones, wireless-enabled identification cards, etc. The upgrade kit 100 can therefore circumvent a need to retrofit an existing vehicle to enable vehicle-sharing by instead converting a single key associated with the vehicle, such as offsite as described above. The upgrade kit 100 can also enable sharing of new vehicles of different makes and models within the same vehicle-share platform or ecosystem without necessitating partnerships between OEMs to standardize equipment (e.g., on-board diagnostics (OBD) ports), without necessitating customized equipment installation across the multiple vehicle makes and models, etc.

The upgrade kit 100 can therefore transform an ignition key into an access node into a corresponding vehicle through an external device (e.g., a smartphone, a badge and RFID reader, etc.) without breaching or bypassing security and anti-theft provisions already integrated into the ignition key and corresponding vehicle. In particular, the upgrade kit 100 can add additional components to existing vehicle ignition keys to leverage security and access features already incorporated into these keys by vehicle manufacturers to retroactively provide vehicle-sharing functionality to corresponding vehicles of various makes and models.

1.1 Configurations

In one configuration, an upgraded ignition key (i.e., an ignition key with the upgrade kit 100 installed) can be configured to communicate directly with a mobile computing device (e.g., a smartphone) to receive vehicle access commands, such as a vehicle unlock command. In this configuration, the smartphone can execute a native vehicle share (or vehicle rent) application, such as described in U.S. patent application Ser. No. 13/788,836, to communicate with a remote vehicle-sharing network (or database, server, etc.) to book the vehicle, such as over Wi-Fi or cellular communication protocol. Once the vehicle is booked, the native vehicle share application can also download authentication data, such as a rolling code, from the vehicle-sharing network to enable communication with the upgraded key—and therefore access to the vehicle—such as over Bluetooth Low-Energy (BTLE) wireless communication protocol. In one example, an owner of a personal vehicle can have a key for his vehicle retrofit with the upgrade kit 100 to enable occasional sharing of the vehicle without installation of special or vehicle share platform-specific equipment into the vehicle itself.

In another configuration, the upgrade kit 100 includes a diagnostic port dongle 190 that installs into a standardized diagnostic port (e.g., OBD2 port) of the vehicle, as described below. In this configuration, the dongle 190 can function as a router that communicates access commands from the phone to the upgraded ignition key or from a vehicle-sharing network (e.g., a remote server) to the upgraded ignition key. Similar to the configuration described above, a user can access a native vehicle share application executing on his smartphone to book the vehicle with on a vehicle share platform, and the native vehicle share application can download authentication data from the vehicle-sharing network to authenticate communication with the dongle 190, such as over Wi-Fi or cellular communication protocol. The user can then interface with the native vehicle share application to send a vehicle unlock command to the dongle 190 (e.g., via Bluetooth 2.0 communication protocol), which routes the command to the upgraded ignition key (e.g., via Bluetooth 4.0 communication protocol), which then issues an unlock command to the vehicle to unlock a door of the vehicle (e.g., via Zigbee communication protocol). Alternatively, once the user books the vehicle through the native vehicle share application on his smartphone, the user can further interface with the native vehicle share application to send a vehicle unlock command to the vehicle share platform, which transmits the command to the dongle 190 (e.g., via cellular communication protocol), which then routes the command to the upgraded ignition key, which finally issues an unlock command to the vehicle to unlock a door of the vehicle (e.g., all in less than two seconds). In the foregoing implementations, the dongle 190, the native vehicle share application, and/or the vehicle-sharing network can default to routing vehicle access commands from the smartphone to the dongle 190 via the vehicle-sharing network as long as cellular communication is supported but shift to direct communication between the smartphone and the dongle 190 when cellular communication is lost, such as when the vehicle is underground, in a parking structure, or in a remote area, as described below. In this configuration, the dongle 190 can also collect vehicle diagnostic information through the OBD port, such as mileage and fuel or energy level, and transmit this information to the vehicle-sharing network directly or indirectly through the user's smartphone. In one example, a large rental vehicle fleet can implement this configuration of the upgrade kit 100 and associated methods across its rental vehicles to provide customers with quick access to its vehicles through their smartphones and without any interaction with a fleet representative and to enable the fleet to collect information about its vehicles before, during, and/or after rental to customers.

In yet another configuration, the upgrade kit 100 can further include a card reader 192 configured to extract data from an adjacent badge, identification (ID) card, or other near-field wireless-enabled device place and to communicate these data to the dongle 190. For example, the card reader 192 can include an RFID reader mounted inside the vehicles windshield, a user can tap his employee or student ID card on the windshield over the RFID reader, the RFID reader can extract information from the ID card and send this information over a hard line to the dongle 190, and the dongle 190 can transmit the information to the vehicle-sharing network (e.g., over cellular or Wi-Fi communication protocol). The platform can then retrieve identification information for the user (e.g., a user rental profile) and stored payment information to confirm user access to the vehicle. In this example, the platform can then transmit an unlock command back to the dongle 190 (e.g., over cellular or Wi-Fi communication protocol), and the dongle 190 can route the command to the upgraded ignition key (e.g., over Bluetooth 4.0 communication protocol) to unlock the door for the user and thus provide the user with access to the vehicle (e.g., within two seconds of reading the user's ID card with the RFID reader). In this example, the user can subsequently interface directly with the upgraded key to lock and unlock the vehicle rather than tapping his ID card on the RFID reader each time he unlocks the car during his rental period. The dongle 190 and additionally or alternatively sync or pair with the user's mobile computing device (e.g., smartphone) such that the user can control access to the vehicle with his mobile computing device, such as through a native vehicle share application executing on the mobile computing device. Like the foregoing configuration, the dongle 190 can also collect vehicle information through the OBD port, such as vehicle speed and fuel level, and transmit this data to the vehicle share platform. The card reader 192 can also collect user information from multiple ID cards tapped over the reader by multiple users before a single rental period, the dongle 190 can transmit the user information for the multiple users to the vehicle share platform, and the platform can log use of the vehicle by the set of users during a single rental period and further distribute the cost of the rental period across the set of users. Furthermore, in this configuration, the card reader 192 can incorporate a visual indicator described in described in U.S. patent application Ser. No. 13/788,836 to provide visual access to availability of the corresponding vehicle to potential users outside and within visual range of the vehicle, and the visual indicator can source power through an OBD port of the vehicle through the dongle 190 and a connected hard line to the card reader 192. In one example of this configuration, a university or professional campus can implement this configuration of the upgrade kit 100 and associated methods to provide students and employees, respectively, with access to its fleet of vehicles through their ID cards.

1.2 Wireless Receiver

The wireless receiver 120 of the upgrade kit 100 is configured to receive an unlock request from an external device. Generally, the wireless receiver 120 functions to expand the wireless communication capability of the existing ignition key to enable transmission of vehicle access commands to the ignition key from a smartphone, a tablet, a diagnostic port dongle 190, or other external device. For example, the wireless receiver 120 can receive door lock and door unlock commands and ignition authorization commands (e.g., to disable the wireless jammer 110) from a mobile computing device or the dongle 190.

The wireless receiver 120 can also include a transmitter to enable two-way communication with the smartphone, a tablet, a diagnostic port dongle 190, or other external device. For example, the wireless transmitter can include a Bluetooth (e.g., Bluetooth LE, BLE, Bluetooth 4.0, or Bluetooth Smart) transceiver module with a radio antenna capable of receiving and/or transmitting wireless signals up to a distance of ten feet.

The wireless receiver 120 (in cooperation with a processor 150 within the upgrade kit 100 or the ignition key) can implement security techniques to authenticate communication between the upgraded ignition key and an external device. For example, the wireless receiver 120 can store a rolling code algorithm to generate new rolling codes, and the vehicle-sharing network executing on a remote server can store an identical rolling code algorithm, generate a new rolling code when a vehicle rental is confirmed for a user, and then transmit the new rolling code to the user's smartphone. In this example, the smartphone can then transmit an access request command (e.g., a door unlock command) with the rolling code to the upgraded ignition key, wherein the wireless receiver 120 authenticates communication with the user's smartphone by comparing the receiver rolling code with the locally-generated rolling code and implements the access request command once communication with the smartphone is authenticated. Alternatively, the wireless receiver 120 and the dongle 190 can store identical rolling code algorithms, and the dongle 190 can transmit each access request with a new rolling code to the upgraded ignition key, wherein the wireless receiver 120 authenticates each new rolling code and relays selectively implement the access request commands when corresponding rolling codes are authenticated. However, the wireless receiver 120 (and process, etc.) can implement any other security and/or authentication technique or protocol during use within the upgraded ignition key.

1.3 Wireless Jammer

The wireless jammer 110 of the upgrade kit 100 is configured to interfere with wireless transmission from the immobilizer transponder. Modern vehicle ignition keys commonly include a blade that forms a physical key that engages an ignition key receptacle within the vehicle and an immobilizer transponder that transmits digital key to a receiver within the vehicle. A modern vehicle may therefore require both insertion of the blade into an ignition receptacle and receipt and authentication of a digital key from an immobilizer transponder to enable operation of the vehicle, such as to enable vehicle ignition or to unlock the vehicle's steering wheel. The wireless jammer 110 therefore functions to prevent and/or interfere with transmission of a digital key from a transponder within a stock key. By inhibiting communication from the stock key to the vehicle, wireless jammer can thus prevent vehicle ignition of the vehicle, release a steering lock within the vehicle, or otherwise enable vehicle operation.

Modern immobilizer transponders are commonly sealed in plastic or glass housings and are powered wirelessly from transmitters within corresponding vehicles, such as transmitters adjacent ignition key receptacles. The wireless jammer no can therefore actively or passively "jam" a radio frequency (RF) channel between the key's stock immobilizer transponder and a receiver within the vehicle. In one implementation, the wireless jammer 110 includes a passive load (e.g., a resistor) between an inductive coil that harvests energy from a wireless signal broadcast by the vehicle and a radio transmitter within the transponder. In this implementation, wireless jammer can also include a switch that defaults to closing the passive load into the circuit between the inductive coil and the radio transmitter but that removes the passive load from the circuit between inductive coil and the radio transmitter when operation of the vehicle is authorized.

In another implementation, the wireless jammer no includes a second transponder arranged adjacent the stock immobilizer transponder within the stock ignition key. In this implementation, the wireless jammer 110 jams the immobilizer transponder by transmitting a second signal simultaneously with the transponder signal such that the receiver within the vehicle cannot discern the transponder signal and authorize ignition of the vehicle. In this implementation, the second transponder can also harvest energy from the wireless signal output by the vehicle and that powers the immobilizer transponder. For example, the second transponder can include an energy harvesting induction coil. In this example, the second transponder can thus output the second signal whenever the immobilizer transponder is powered, and the upgraded ignition key can default to closing a circuit between the energy harvesting induction coil and a wireless radio within the second transponder, but a switch within the wireless jammer no can open the circuit between the energy harvesting induction coil and the wireless radio within the second transponder when operation of the vehicle is authenticated. For example, a processor 150 within the upgraded ignition key open the circuit between the energy harvesting induction coil and the wireless radio within the second transponder for one minute, five minutes, or the duration of the vehicle rental period once operation of the vehicle is authenticated.

In the foregoing implementation, the second transponder can alternatively be powered by a battery 160 within the upgraded key (e.g., a stock battery or a battery 160 included in the upgrade kit 100), and the second transponder can source power from the battery 160 to transmit the second signal at a power lever substantially greater than a wireless power level of the immobilizer transponder to thus overwhelm a signal from the immobilizer transponder and prevent receipt of the signal from the immobilizer transponder at the vehicle.

In the foregoing implementations, the second transponder can transmit "gibberish" (e.g., a pseudorandom signal) that is timed with the signal from the immobilizer transponder to interfere within receipt of the complete digital key at the vehicle. Alternatively, the second transponder can transmit an "inverted" digital key that substantially cancels the signal transmitted from the immobilizer transponder. Yet alternatively, the second transponder can transmit the second signal at a power level substantially greater than the power level of the signal output by the immobilizer transponder such that the immobilizer transponder signal is masked or "hidden" from a receiver within the vehicle. However, the second transponder can function in any other way to interfere with or inhibit transmission of a digital key from the stock immobilizer transmitter within the key to a corresponding vehicle.

In yet another implementation, the wireless jammer no includes a conductive coil configured for arrangement about the immobilizer transponder. In this implementation, the wireless jammer no can power the conductive coil to create a magnetic field about the immobilizer transponder to inhibit wireless transmission from the immobilizer transponder beyond the conductive coil. In one example, the conductive coil is powered by a battery within the upgraded ignition key and defaults to a powered or "ON" state until ignition authorization is received from a smartphone, the dongle 190, or another external device. Alternatively, the conductive coil can be passively powered. For example, the conductive coil to a closed-circuit state such that a signal transmitted by the vehicle induces an electrical current through the coil, thus jamming wireless transmission from the immobilizer transponder. In this example, the wireless jammer 110 can default to closing the conductive coil circuit (i.e., closing a circuit between ends of the coil) but open the conductive coil circuit when ignition authorization is received from a smartphone, the dongle 190, or another external device, such as for a present period of time or for the duration of the vehicle rental period, as described above.

In another implementation, the wireless jammer no includes a shield and an actuator that moves the shield relative to the immobilizer transponder to intermittently block wireless transmission from the immobilizer transponder to a receiver within in the vehicle. For example, the shield can include a lead tube, and the actuator can move the tube fore and aft to enclose (as a default) and then reveal the immobilizer transponder. However, the wireless jammer 110 can include any other component and function in any other way to interfere with wireless transmission of a digital key from the ignition key to the vehicle.

As shown in FIG. 1, one variation of the upgrade kit 100 includes a sensor 160 configured to trigger the wireless jammer 110 to inhibit communication from the transponder to the vehicle. In this variation, the upgrade kit 100 can also include a processor 150 that actuates the wireless jammer 110 to inhibit transmission of the digital key from the immobilizer transponder based on an output of the sensor 170 when operation of the vehicle is not authorized (e.g., when an authorization signal is not received from an external device).

In one implementation, the sensor 170 includes a motion sensor—such as an accelerometer—and the processor 150 actuates the wireless jammer 110 when the sensor 170 outputs a signal indicating that the key is moving. For example, when the key is removed from a key dock within the vehicle, the processor 150 can send power to the wireless jammer 110 to inhibit transmission of the digital key from the immobilizer transponder as a user moves the ignition key toward an ignition key receptacle within the vehicle.

In another implementation, the sensor 170 includes an orientation sensor, and the processor 150 is configured to correlate an output of the orientation sensor with an orientation of the key blade of the ignition key. In this implementation, when the detected orientation of the key blade substantially matches a known insertion orientation for the key blade into the vehicle's ignition receptacle, the processor 150 can determine that the insertion of the key blade into the vehicle's ignition receptacle is pending or immediate and thus trigger the wireless jammer 110 to prevent ignition of the vehicle if operation of the vehicle is not currently authorized. In one example, the sensor 170 includes both an accelerometer and a gyroscope, and the processor 150 fuses signals from these sensors to determine a current orientation of the ignition key and then actuates the wireless jammer 110 accordingly. In this implementation, the sensor 170 can include one or more tilt sensors that trigger when the upgraded ignition key is oriented into a position that substantially matches a known insertion orientation for the key blade into the vehicle's ignition receptacle.

In yet another implementation, the sensor 170 is configured to detect proximity of the ignition key to a key dock, and the sensor 170 or the processor 150 actuates the wireless jammer 110 in response to removal of the upgraded ignition key from the key dock 180 if operation of the vehicle is not currently authorized. For example, the sensor 170 can include a Hall effect sensor that outputs a first sensor state when a magnetic region of the key dock 180 is detected and a second sensor state when the magnetic region of the key dock 180 is not detected, and the processor 150 can turn the wireless jammer no "ON" when the sensor 170 output changes from the first state to the second state and if operation of the vehicle is not currently authorized, and the processor 150 can turn the wireless jammer no "OFF" when the sensor 170 output changes from the second state to the first state. The sensor 170 and the processor 150 can thus cooperate to deactivate the wireless transponder (by actuating the wireless jammer no) if removal of the upgraded ignition key from the key dock 180 is invalid or unauthorized.

In the foregoing implementation, the upgraded ignition key can therefore interface with a key dock 180, as described below and shown in FIGS. 2 and 3. In this implementation, the upgrade kit 100 can also include a visual indicator 170, which is configured to display a visual alarm through the enclosure 140 in response to detected removal of the key from the key dock 180. For example, the visual alarm can include a warning lamp (e.g., an LED), and the processor 150 can flash the warning lamp when removal of the upgraded ignition key from the key dock 180 is detected without receipt of authorization of the vehicle for operation. Alternatively, the ignition key can include a speaker, buzzer, or other actuator, and the processor 150 can similarly drive the speaker, buzzer, or other actuator to deliver an audible, haptic, or other alarm to a user to prompt the user to return the upgraded ignition key to the key dock 180. Once replacement of the upgrade ignition key on the key dock 180 is detected, the processor 150 can turn "OFF" or silence the alarm. However, the processor 150 and the sensor 170 can function in any other way to trigger actuation of the wireless jammer 110 to prevent transmission of the digital key from the key to the vehicle and/or to trigger actuation of an alarm to guide user interaction with the key.

The wireless jammer 110 can further be substantially tamperproof such that the wireless jammer no cannot be removed (or would be difficult to remove) from the upgraded ignition key without destroying the immobilizer transponder. For example, the wireless jammer no can be potted around or adjacent the immobilizer transponder, such as with an epoxy, such that separation of the wireless jammer no from the immobilizer transponder is substantially impossible or requires specialized equipment. Similarly, the upgrade kit 100 can include a sensor configured to detect tampering of the upgraded ignition key, and the upgrade kit 100 can further include self-destruct module configured to destroy the immobilizer transponder when tampering is detected. The upgrade kit 100 can also trigger the self-destruct module when the upgrade ignition key is improperly removed (i.e., without authorization) from the dock. The wireless jammer 110 can therefore be installed in the upgraded ignition key to substantially prevent operation of the vehicle following tampering of the upgraded ignition key, such as after forced entry into the vehicle.

Additionally or alternatively, for an ignition key without a blade and configured to communicate with a vehicle wirelessly rather than through a physical key tumbler, the wireless jammer 110 can implement similar methods or techniques to control wireless transmission of a pairing signal from the ignition key to the corresponding vehicle.

1.4 Relay

The relay 130 of the upgrade kit 100 is configured to actuate the keyless entry transmitter to unlock a door of the vehicle in response to the unlock request. Generally, the upgrade kit 100 includes one or more relays configured to bypass a physical vehicle access button within the ignition key to enable remote control of the wireless transmission of vehicle access commands from the upgraded ignition key to the vehicle. For example, the upgrade kit Dm can include a digital relay for each of the lock, unlock, trunk-open (or trunk unlock), and panic (or panic silence) functions integrated into an ignition key. Each relay can thus be independently controlled to trigger wireless transmission of corresponding commands to the vehicle. The relay 130 can include a solid-state transistor, such as a MOSFET or a BJT with a pull-down resistor, or the relay 130 can include an analog relay or any other suitable type of switch or relay.

In one implementation, the upgrade kit 100 includes a set of relays, and a relay 160 in the set of relays is installed on a printed circuit board housed in the enclosure 140. In this implementation, the relay 130 is connected across the unlock button on the ignition key and defaults to open. Thus, in response to receipt of an authorized vehicle unlock request (e.g., from a smartphone or the dongle 190), the wireless receiver 120 can output a signal to toggle the state of the relay 130 from open to closed, thus mimicking an selection of the unlock button on ignition key and triggering transmission of an unlock command from the upgraded key to the vehicle. Other relays in the set of relays can be similarly connected across corresponding buttons on the ignition key, and the wireless receiver 120 can distribute signals to toggle states of the relay 130s based on receipt of corresponding authorized vehicle access requests. The wireless receiver 120 can similarly toggle the state of the wireless jammer no in response to confirmation or receipt of authorization of current vehicle operation.

The foregoing configuration can thus enable wireless control of the vehicle access functions within the key without disturbing manual control of physical buttons on the ignition key to control vehicle lock, unlock, and other functions directly with the ignition key. However, the relay 130 can be of any other suitable type and can be coupled to the ignition key in any other suitable way.

1.5 Enclosure and Key Dock

The enclosure 140 of the upgrade kit 100 is configured to contain the wireless receiver 120 and a portion of the ignition key. Generally, the enclosure 140 functions to expand the interval volume of the stock ignition key to house various components of the upgrade kit 100.

In one implementation, the enclosure 140 is coupled to the stock housing of the ignition key, such as with a mechanical fastener or with an adhesive. In this implementation, the enclosure 140 can fully contain the wireless jammer no, the wireless receiver 120, the processor 150, the sensor 170, the relay 130, the battery 160 (described below), etc., and leads (e.g., wires) can bridge a junction between the enclosure 140 and the stock housing to electrically couple the relay 130 to a corresponding vehicle access button on the ignition key. Alternatively, the wireless jammer 110 can be installed inside the stock housing and connected to the wireless receiver 120 and/or to the processor 150 via a loose lead (e.g., a wire) that bridges the junction between the enclosure 140 and the stock housing.

In another implementation, electronic (e.g., "smart") components within the stock ignition key are removed from the stock housing and placed inside the housing with any of the foregoing components of the upgrade kit 100. The enclosure 140 can thus define a standalone unit or "fob" that houses all "smart" or electronic components of the upgrade kit 100 and the ignition key. The fob can then be coupled to the "dumb" ignition key, such as with a key ring. The immobilizer transponder transferred into the enclosure 140 can thus transmit the digital key through the enclosure 140, and a user can insert a blade of the "dumb" ignition key into a key receptacle in the vehicle to start the vehicle.

Yet alternatively, the stock housing of the ignition key can be replaced by the enclosure 140, and the enclosure 140 can thus house components of the upgrade kit 100 and electronic components of the ignition key and further support a blade portion of the ignition key (if applicable).

In any of the foregoing implementations, the enclosure 140 can be similarly installed on, coupled to, or replace the stock housing of a stock key fob accompanying a stock "dumb" key for a vehicle.

Figure 2:
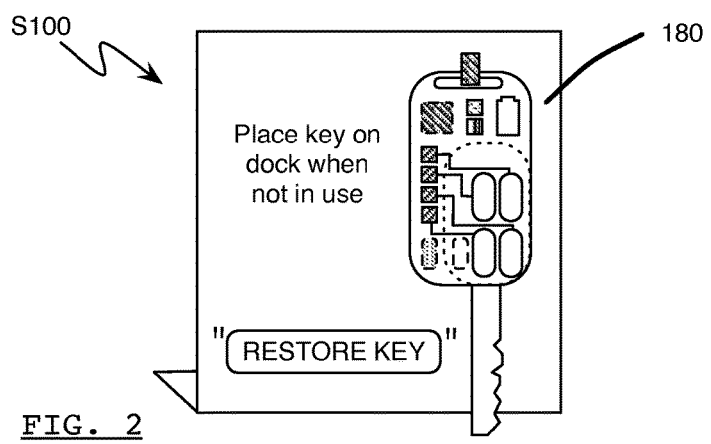
FIG. 2 is a schematic representation of one variation of the upgrade kit.
Figure 3:
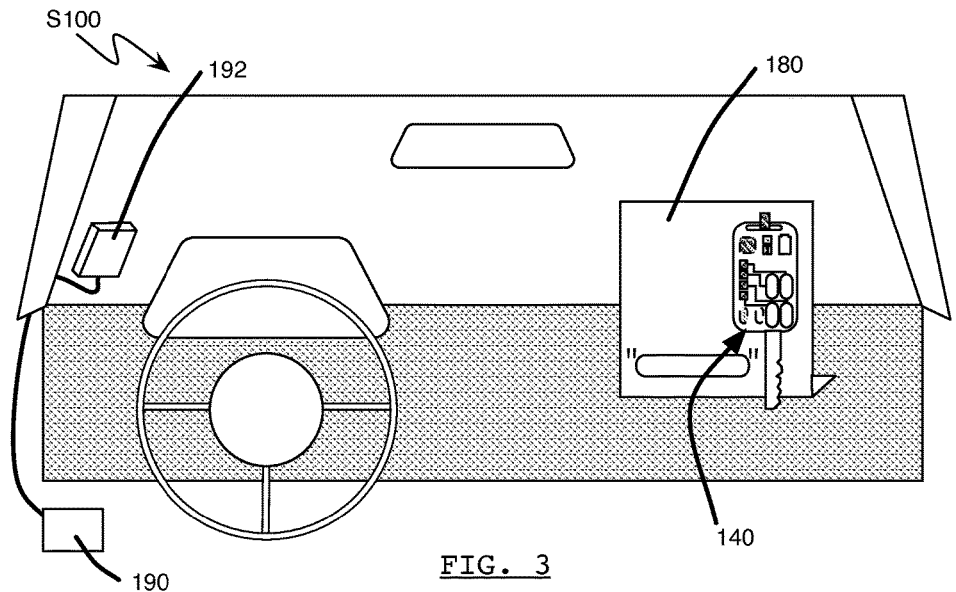
FIG. 3 is a schematic representation of one variation of the upgrade kit.

As shown in FIGS. 2 and 3, one variation of the upgrade kit 100 further includes a key dock configured to support the upgraded ignition key. In this variation, the key dock 180 is configured for installation within the vehicle to define a "home" for the upgraded ignition key such that a user knows both where to find the upgraded key when first accessing the vehicle and where to replace the upgraded ignition key when returning the vehicle.

In one example, the key dock 180 can be screwed, bolted, taped, or adhered to a portion of the vehicle, such as to the vehicle's dashboard, rearview mirror, or front windshield. In this example, the upgraded ignition key can be shipped with the key dock 180 and double-sided tape such that an owner or affiliate of the vehicle can quickly install the key dock 180 in the vehicle with the double-sided tape. In another example, the key dock 180 includes a claw configured to engage (e.g., lock into) an air vent within the vehicle. In yet another example, the key dock 180 includes a lockable plug for a cigarette lighter. In this and the foregoing examples, the key dock 180 can also include a cable and/or plug to engage a cigarette lighter (or other power port) within the vehicle to source power to detect removal of the ignition key from the key dock 180 and to activate an alarm accordingly. The key dock 180 can additionally or alternatively source power from the vehicle to charge the battery 160 (described below). For example, the key dock 180 can include a pair of conductive pads that contact conductive areas on the enclosure 140 when the upgraded ignition key is placed on the key dock 180 such that the battery 160 within the upgrade kit 100 can be recharged.

The key dock 180 can further include a magnet, a ferrous plate, a shelf, a hook, or other feature, and the enclosure 140 can define a complementary feature configured to transiently engage the magnet, the ferrous plate, etc. For example, the enclosure 140 can include ferrous section such that the magnet of the housing can retain the ferrous section of the enclosure 140. Similarly, the enclosure 140 can include a magnetic that can retain the upgraded ignition key against the ferrous plate of the key dock 180. Alternatively, the enclosure 140 can include a hoop that can engage the hook on the key dock 180, though the enclosure 140 and the key dock 180 can mate in any other suitable way.

As described above, the upgrade kit 100 can also include a sensor 170 configured to output a signal corresponding to proximity of the enclosure 140 (and therefore the upgraded ignition key) to the key dock 180. The upgraded ignition key can thus actuate an alarm if the key is removed from the key dock 180 prior to receipt of authorization to operate the vehicle, as described above.

Additionally or alternatively, the upgraded ignition key and the key dock 180 can be coupled with a physical leash, such as a braided steel cable. However, the key dock 180 can include any other feature to mate with and/or support the upgraded ignition key, and the key dock 180 can be mounted within the vehicle in any other suitable way.

1.6 Battery

As shown in FIG. 1, one variation of the upgrade kit 100 includes a battery 160 configured to power the wireless jammer 110 and the relay 130. Generally, the battery 160 functions to provide power to any one or more of the relay 130, the wireless receiver 120, the wireless jammer 110, etc. In one implementation, the battery 160 includes a rechargeable battery. For example, the battery 160 can recharge through the key dock 180, as described above. Alternatively, the battery 160 can include a replaceable coin battery.

1.7 Dongle

As shown in FIG. 3, one variation of the upgrade kit 100 includes a diagnostic port dongle 190 180 configured to engage a diagnostic port within the vehicle. Generally, as described above, the diagnostic port dongle 190 can be configured for installation into a standardized diagnostic port (e.g., OBD2 port) of the vehicle to expand functionalities of the upgraded ignition key and to define a standard interface between a user and the upgraded ignition key.

In one implementation, the dongle 190 handles wireless communication between the user (e.g., via s smartphone and/or a remote server) and the upgraded ignition key. For example, the dongle 190 can support cellular, Wi-Fi, Bluetooth 2.0, and Bluetooth 4.0 (BTLE) wireless communication protocols. In this example, the dongle 190 can communicate with the wireless receiver 120 (or transceiver) over BTLE but communicate with a user's mobile computing device directly over Bluetooth 2.0 or indirectly over Wi-Fi and/or cellular communication protocols. The dongle 190 can therefore function as a router to enable a user to communicate vehicle access commands to the upgraded ignition key over various protocols despite limitations in wireless protocols supported by the wireless receiver 120 and despite limitations in wireless protocols supported by the user's mobile computing device (e.g., the user's smartphone). The dongle 190 can therefore incorporate any number of wireless transmitters and/or receivers to enable communication with the upgraded ignition key (via the wireless receiver 120), a mobile computing device (e.g., a smartphone), and a remote server (e.g., the vehicle share platform).

The dongle 190 can further collect vehicle diagnostic data through the connected OBD port, such as vehicle mileage, fuel or energy level, and system diagnostics (e.g., a check-engine status, an oil change alarm, etc.). The dongle 190 can additionally or alternatively include one or more sensors, such as an accelerometer, a gyroscope, and a location (e.g., Global Positioning System) sensor. The dongle 190 can source power for these sensors through the OBD port and store data output by the sensor 170s in onboard memory and/or transmit these data to an external device. For example, the dongle 190 can upload vehicle diagnostic data and/or internal sensor data to the mobile computing device of a user (e.g., via Bluetooth 2.0 or Wi-Fi) during a corresponding rental period, and the mobile computing device can subsequently offload these data to the vehicle-sharing network (e.g., over a cellular connection). Alternatively, the dongle 190 can transmit these data directly to the vehicle-sharing network (or other entity), such as over Wi-Fi when the vehicle is returned to a docking space or over a cellular connection in real-time.

As described above, the dongle 190 can default to communication with the user's mobile computing device via a remote server (e.g., the vehicle share platform), such as over cellular communication protocol. In this implementation, vehicle-specific security data required to access the vehicle can remain on the remote server and not shared with the user's mobile computing device to maintain a high degree of security for the vehicle. However, when the dongle 190 detects limited communication with the remote server, such as if cellular signal strength drops below a threshold value, the dongle 190 can resort to direct communication with the mobile computing device to receive vehicle access requests from the user. For example, the dongle 190 can enable limited vehicle access functionality directly through the mobile computing device or communicate a digital key—that is valid for a limited period of time—to the mobile computing device to enable direct submission of vehicle access requests from the mobile computing device.

However, the diagnostic port dongle 190 can include any other suitable sensor, support any other suitable wireless communication protocol, and communication data, authentication codes, vehicle access requests, etc. between the upgraded ignition key and an external device in any other suitable way.

2. Method of Installation

Figure 5:
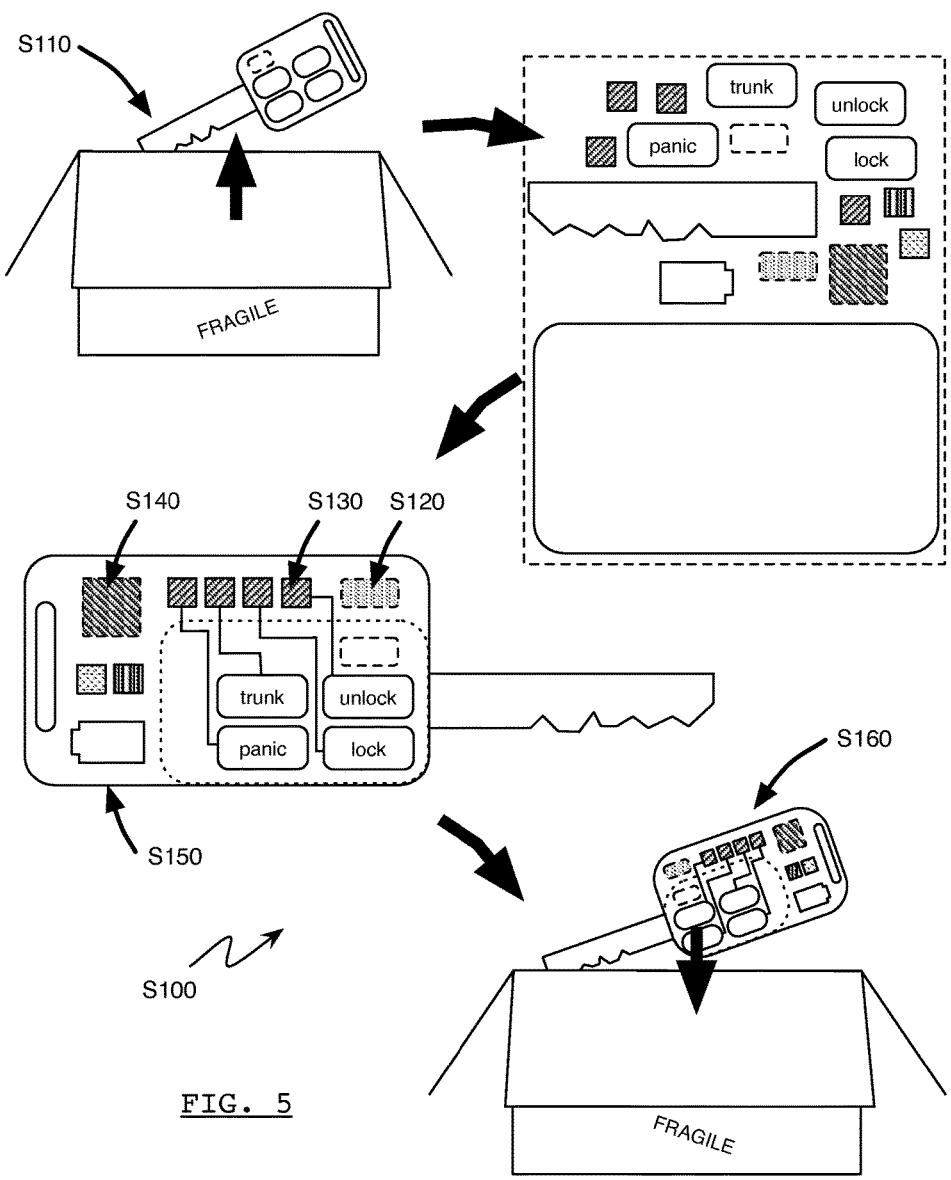
FIG. 5 is a flowchart representation of a first method of the invention.

As shown in FIG. 5, a first method S100 for upgrading an ignition key corresponding to a vehicle includes: receiving the ignition key from an affiliate of the vehicle in Block Silo; installing a wireless jammer proximal an immobilizer transponder within the ignition key in Block S120, coupling a relay to a keyless entry transmitter within the ignition key in Block S130, coupling a wireless receiver to the wireless jammer 110 and the relay 130 in Block S140, enclosing the wireless receiver 120 and a portion of the ignition key in Block S150, and returning the ignition key to the affiliate in Block S160.

Generally, the first method S100 enables remote installation of the upgrade kit 100 into an existing ignition key such that vehicle-sharing and/or vehicle renting functionality can be remotely and retroactively enabled for the vehicle. For example, the first method S100 can be completed by a vehicle-sharing platform associated with the vehicle-sharing platform described above to upgrade ignition keys for consumers, education campuses, corporate campuses, rental fleets, etc. to thus enable sharing and/or renting of corresponding vehicles owned or leased by a variety of entities of various types.

In one application of the first method S100, the vehicle-sharing platform (or a representative thereof) sends customized packaging to an affiliate of a vehicle. Once the customized packaging is received, the affiliate places one of two ignition keys corresponding to the vehicle into the customized packaging and returns the customized packaging to the vehicle-sharing platform. A representative of the vehicle-sharing platform then opens the stock housing of the received ignition key and removes a key blade and all electronic components from the stock housing. The representative further installs the key blade and the electronic components from the stock key into a new enclosure (i.e., the enclosure 140) with the wireless jammer 110, the wireless receiver 120, the processor 150, the sensor 170, the relay 130, and/or the battery 160, etc. During this installation, the wireless jammer 110 can be arranged around or adjacent the immobilizer transponder and then potted in place, as described above. Once the assembly of the enclosure 140 and contents is complete, the representative ships the updated ignition key with a key dock back to the affiliate, who then installs the key dock 180 in the corresponding vehicle (e.g., by taping the key dock 180 to the vehicle's dashboard with double-sided tape) and places the upgraded ignition key on the key dock 180. The vehicle can then be rented by or shared with other users through the vehicle-sharing platform, as described below and in U.S. patent application Ser. No. 13/788,836.

In the foregoing application, for the affiliate who desires greater vehicle security and/or access to additional vehicle data, the representative of the vehicle-sharing platform can ship the upgraded ignition key with a diagnostic port dongle 190 back to the affiliate of the vehicle. Once the dongle 190 is received with the upgraded ignition key, the affiliate can install the dongle 190 in the vehicle's OBD (e.g., OBD2)

port and link the dongle 190 to an associated vehicle-sharing profile within the vehicle-sharing platform. The affiliate can thus access data transmitted from the dongle 190 through the associated vehicle-sharing profile, such as through a web browser or native vehicle-sharing application executing on a smartphone or tablet.

Furthermore, in the foregoing application, for vehicle-sharing applications within a group of potential users with wireless-enabled badges or identification cards, the representative of the vehicle-sharing platform can ship the upgraded ignition key with a card reader 192 back to the affiliate of the vehicle. Once the card reader 192 is received, the affiliate can install the card reader 192 by mounting the card reader 192 on the windshield or on the dashboard of the vehicle, routing a power and data cable behind an interior driver's-side A-pillar cover within the vehicle, and plugging the power and data cable into the OBD port or into the diagnostic port dongle 190. Alternatively, a representative of the vehicle-sharing platform can travel to the vehicle to personally install the card reader 192, or the affiliate can bring the vehicle to an automotive dealer, an automotive repair shop, a shop associated with the vehicle-sharing platform, etc. for professional installation of the card reader 192. The affiliate can then link the card reader 192 to the associated vehicle-sharing profile to enable vehicle-sharing through the card reader 192.

However, the upgrade kit 100 can be installed in the ignition key and/or the vehicle in any other suitable way and by any other suitable party.

3. Upgraded Key Operation

Figure 6:
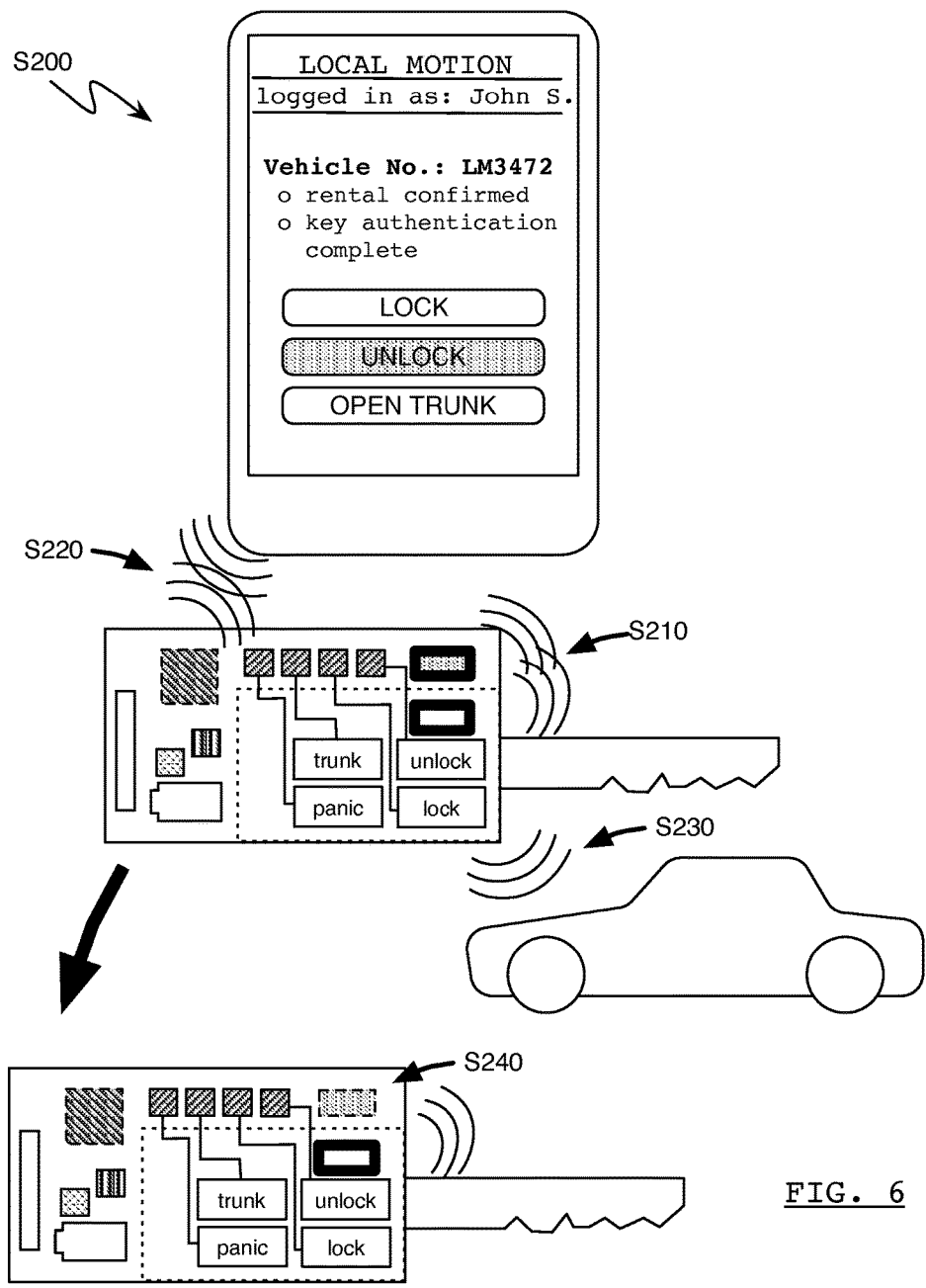
FIG. 6 is a flowchart representation of a second method of the invention.

As shown in FIG. 6, a second method S200 for controlling an ignition key associated with a vehicle includes: enabling a wireless jammer adjacent an immobilizer transponder within the ignition key in Block S210; wirelessly pairing the ignition key with an external device in Block S220, in response to receiving a door unlock signal from the external device, wirelessly transmitting a door unlock command from the ignition key to the vehicle in Block S230, and in response to receiving an authorization signal from the external device, disabling the wireless jammer no in Block S240.

Generally, the second method S200 is implemented by (or at) the upgraded ignition key once the upgrade kit 100 is installed and the corresponding vehicle is activated for rental to or sharing with other users. In particular, the wireless jammer 110, the wireless receiver 120, the processor 150, the sensor 170, the relay 130, the battery 160, etc. of the upgrade kit 100 can cooperate with one or more stock components of the ignition key to implement the second method S200, thereby providing access to the vehicle—including vehicle unlock and ignition controls—for an authorized user.

Block S210 of the second method S200 recites enabling a wireless jammer adjacent an immobilizer transponder within the ignition key. Generally, Block S210 controls the wireless jammer no of the upgrade kit 100 to interfere or inhibit wireless transmission of a digital key from an immobilizer transponder in the upgraded ignition key to the corresponding vehicle. Block S210 can therefore function to prevent ignition of the vehicle until operation of the vehicle is authorized, as described below.

In one implementation, Block S210 actively enables the wireless jammer 110 by selectively distributing power from the battery 160 to the wireless jammer no. In another implementation, Block S210 passively enables the wireless jammer 110 by selectively closing a circuit between the wireless jammer no and a wireless communication energy harvester (e.g., a energy harvesting induction coil) within the upgraded ignition key, as described above. For example, Block S210 can close a circuit between a stock wireless communication energy harvester coupled to the immobilizer transponder and the second transponder within the wireless jammer 110 to enable the wireless jammer 110. Alternatively, Block S210 can close a circuit between a second wireless communication energy harvester and the second transponder within the wireless jammer 110 to enable the wireless jammer 110. Yet alternatively, Block S210 can close a circuit between ends of a conductive coil (i.e., the wireless jammer 110) arranged about the immobilizer transponder, as described above.

Block 210 can default to activating the wireless jammer no whenever vehicle operation is not authorized. For example, Block S210 can default to closing a circuit between a wireless communication energy harvester and the second transponder, and Block S240 can open this circuit for a limited period of time only when a vehicle operation authorization is received from an external device or is currently pending on the upgraded ignition key. Alternatively, Block 210 can interface with a motion sensor (and the processor 150 described above) to determine that the upgraded ignition key is moving and then actively power the wireless jammer 110 if vehicle operation authorization is not current. Similarly, Block 210 can interface with an orientation sensor (and the processor 150) to determine that the upgraded ignition key is arranged in a position substantially matching a known insertion orientation for the key blade into the vehicle's ignition receptacle, as described above. For example, Block S210 can be implemented by an analog circuit containing a set of tilt sensors arranged along various axes of the upgraded ignition key, wherein the tilt sensors close a circuit between the battery 160 and the second transponder within the wireless jammer no when the upgraded ignition key is placed in a particular orientation. Thus in the foregoing implementations, Block S210 can selectively transmit power from the battery 160 to the wireless jammer 110 in response to a certain detected state (e.g., motion, position, etc.) of the upgraded ignition key.

However, Block S210 can passively or actively actuate the wireless jammer no in any other way and control the wireless jammer no according to any other input or state of the upgraded ignition key.

Block S220 of the second method S200 recites wirelessly pairing the ignition key with an external device. Generally, Block S220 functions to establish wireless communication between the wireless receiver 120 (or transceiver) within the upgraded ignition key and an external device, such as a user's smartphone or the diagnostic port dongle 190.

In one implementation, the wireless receiver 120 in the upgraded ignition key includes a Bluetooth (e.g., Bluetooth 4.0) module, and Block S220 sets the Bluetooth module in a "discoverable mode" when not paired with an external device. Block S220 can then default to establishing a Bluetooth connection with a smartphone outputting a Bluetooth signal of highest strength according to any suitable Bluetooth pairing method or technique. Alternatively, in the variation of the upgrade kit 100 that includes a dongle, the upgraded ignition key can store a unique address of the corresponding dongle, and Block S220 can default to establishing a Bluetooth connection with the dongle 190 based on the unique address linked. (The dongle 190 can implement similar functionality to selectively pair with the upgraded ignition key based on a unique address assigned to the Bluetooth module within the upgraded ignition key.) However, Block S220 can function in any other way to establish a wireless connection with the external device.

Figure 4:
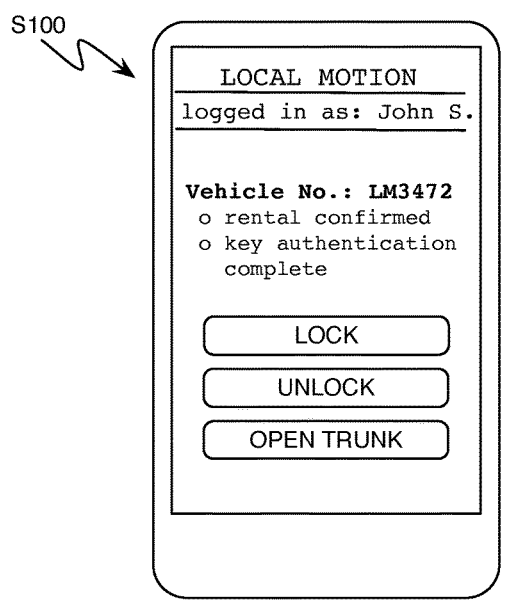
FIG. 4 is a graphical representation of one variation of the upgrade kit.

Block S220 can further authenticate communications from the external device to the upgraded ignition key. For example, Block S220 can authenticate each vehicle access request and/or each vehicle operation authorization from the external device to the upgraded ignition key. In one implementation, the upgraded ignition key stores a security algorithm, a unique (to upgraded ignition keys) code, and a counter that is initialized to "o" when the upgrade kit 100 is first installed in the ignition key. The vehicle-sharing network (or platform) stores an identical security algorithm and unique key and maintains an identical counter. When a vehicle rental is requested by a user and then confirmed at the vehicle-sharing network, the vehicle-sharing network generates a new token based on the security algorithm, the unique key, and the counter. The vehicle-sharing network then transmits the token to the user's mobile computing device (e.g., smartphone) and increments the counter. Once the user's mobile computing device receives the token, the mobile computing device transmits a vehicle unlock request (e.g., automatically or in response to selection of a vehicle unlock request into a native vehicle-sharing application executing on the mobile computing device, as shown in FIGS. 4 and 6) with the token to the upgraded ignition key. In response to receiving the unlock request and the token, Block S220 can generate a local token based on the security algorithm, the unique code, and the counter stored locally on the upgraded ignition key, authenticate the communication from the mobile computing device if the local token matches the token received from the mobile computing device, and index the local counter. If the tokens match, Block S230 can trigger the upgraded ignition key to transmit an unlock command to the vehicle; alternatively, Block S230 can disregard the unlock request and/or trigger an alarm (e.g., after multiple unsuccessful authentication attempts). Subsequently, for each additional vehicle access request selection into the mobile computing device by the user (shown in FIGS. 4 and 6), the mobile computing device can request a new token to the vehicle-sharing network, the vehicle-sharing network can generate the new token if the user is authorized to use the vehicle, index the counter, and return the new token to the mobile computing device. Finally, the mobile computing device can send the new token with the new vehicle access request, which Block S220 can compare to a new local token, and Block S230 can trigger transmission of a corresponding vehicle access command if the new token and new local token match and Block S220 can index the local counter accordingly.

Alternatively, Block S220 can implement the foregoing method to authenticate communication between the external device and the smartphone once, such as at the beginning of a rental period, to enable subsequent transmission of multiple vehicle access requests and/or vehicle operation authorizations from the external device, such as during the span of the rental period. For example, Block S220 can receive a rolling code (i.e., a token) from a smartphone over Bluetooth communication protocol, authenticate the rolling code, and pair the ignition key with the smartphone. In this example, the upgraded ignition key can remain paired to the smartphone or automatically re-pair with the smartphone if communication with the smartphone is interrupted during the rental period. Furthermore, in this example, once the rental period expires, Block S220 can discard an authorized token received from the smartphone to thereby discontinue remote control of the upgraded ignition key through the smartphone.

Block S220 can implement similar functionality to pair and authenticate communication between the diagnostic port dongle 190 and the upgraded ignition key, such as for each vehicle access request submitted by the dongle 190 or for all vehicle access requests submitted by the dongle 190 during a rental period. Furthermore, for variations of the upgrade kit 100 and methods in which the dongle 190 communicate vehicle access requests from a remote server or a mobile computing device (e.g., a smartphone) to the upgraded ignition key, the dongle 190 can additionally or alternatively implement similar functionality to authenticate communications from the remote server and/or from the mobile computing device. However, Block S220 can function in any other way to pair the upgraded ignition key with the dongle 190 (or the dongle 190 with a remote server or a mobile computing device) and to authenticate communications from the external device to the upgraded ignition key (or from the remote server or a mobile computing device to the dongle 190).

Block S230 of the second method S200 recites, in response to receiving a door unlock signal from the external device, wirelessly transmitting a door unlock command from the ignition key to the vehicle. Generally, Block 230 functions to enable remote control of stock vehicle access functions of the stock ignition key based on authenticated vehicle access requests received from the external device. In one implementation, Block S230 toggles a relay coupled to a corresponding vehicle access circuit within the stock electronics of the ignition key. For example, in response to receiving a vehicle unlock request from the external device, Block S230 can toggle the state of a first relay connected across a vehicle unlock button on the stock ignition key PCB to mimic manual selection of the vehicle unlock button. In this example, in response to receiving a vehicle lock request from the external device, Block S230 can similarly toggle the state of a second relay connected across a vehicle lock button on the stock ignition key PCB to mimic manual selection of the vehicle lock button. Furthermore, in this example, in response to receiving a vehicle trunk open (or unlock) request from the external device, Block S230 can toggle the state of a third relay connected across a vehicle trunk open (or unlock) button on the stock ignition key PCB to mimic manual selection of the vehicle trunk open button. Once manual selection of a vehicle access button is thus replicated, a stock wireless communication module(s) of the stock ignition key can transmit corresponding vehicle access commands to a receiver within the vehicle, such as based on stock (i.e., OEM) authentication and encryption techniques integrated into the vehicle and the stock ignition key.

However, Block S230 can respond in any other way to an authenticated vehicle access request from the external device to trigger transmission of a vehicle access command to the vehicle.

Block S240 of the second method S200 recites, in response to receiving an authorization signal from the external device, disabling the wireless jammer no. Generally, Block S240 functions to deactivate or disable the wireless jammer 110 to enable transmission of a digital key from the transponder immobilizer to the vehicle and thereby enable ignition and operation of the vehicle with the upgraded ignition key once operation of the vehicle is authorized.

In one implementation, Block S240 disconnects the wireless jammer 110 from a power source. In one example, Block S240 opens a circuit between the wireless jammer 110 and the battery 160. In another example, Block S240 opens a circuit between the wireless jammer 110 and a wireless communication energy harvester (e.g., a energy harvesting induction coil) within the immobilizer transponder or the second transponder of the wireless jammer 110. In yet another example, Block S240 can disconnect ends of a conductive coil arranged circumferentially about the immobilizer transponder.

In another implementation, Block S240 sets a flag to disregard triggers to activate the wireless jammer no, such as movement of the ignition key or orientation of the ignition key that matches an insertion orientation of the upgraded ignition key into an ignition key receptacle within the vehicle. However, Block S240 can function in any other way to disable or deactivate the wireless jammer 110.

One variation of the second method S200 includes Block S250 (not shown), which recites, in response to detecting a key dock adjacent the ignition key and receiving a door lock signal from the external device, transmitting a door lock command from the ignition key to the vehicle. Generally, Block S250 functions to trigger transmission of a door lock command from the upgraded ignition key to a receiver in the vehicle once the rental period for the vehicle expires and the ignition key is replaced on the key dock 180.

In one implementation, Block S220 receives a rental period duration from the external device, initiates a timer corresponding to the rental period once the vehicle unlock command is transmitted to the vehicle, and tracks the timer. Once the time expires, Block S250 interfaces with the sensor 170 within the upgraded ignition key to detect the proximity of the upgraded ignition key to the key dock 180 and, if the key dock 180 is detected, toggles the relay 130 coupled to the vehicle lock button of the ignition key to trigger transmission of a vehicle lock command to the vehicle. For example, in this implementation, once the rental period expires, the user can place the upgraded ignition key onto the key dock 180, and Block S250 locks the doors of the vehicle accordingly. However, as in this example, Block S250 will not lock the doors of the vehicle until the upgraded ignition is restored to the key dock 180 such that the upgraded ignition key is in the correct (i.e., known) place for a subsequent user.

In another implementation, Block S250 can interface with the sensor 170 to detect the proximity of the upgraded ignition key to the key dock 180. Once detected proximity to the key dock 180 persists for a threshold period of time (e.g., one minute), Block S250 can toggles the relay 130 coupled to the vehicle lock button of the ignition key to trigger transmission of a vehicle lock command to the vehicle to thus lock the vehicle. Block S250 can also transmit a vehicle rental termination command to the dongle 190, to the user's mobile computing device, or to an other external device for subsequent transmission to the vehicle-sharing network to terminate the vehicle rental (and enable time-based billing of vehicle usage and flexible vehicle rental periods). For example, in this implementation, once a user is finished using the vehicle, he can restore the ignition key to key dock and exit the vehicle, and Block S250 can trigger transmission of the vehicle lock command from the upgraded ignition key once the threshold period of time expires. Similarly, once proximity of the key dock 180 is detected by the sensor 170 and the last open door of the vehicle transitions from "open" to "closed," Block S250 can trigger transmission of the vehicle lock command from the upgraded ignition key. Yet similarly, the user can interface with his mobile computing device or the card reader 192 to terminate the vehicle rental, and Block S250 can trigger transmission of the vehicle lock command from the upgraded ignition key accordingly once proximity of the key dock 180 is detected by the sensor 170 (and the last open door of the vehicle transitions from "open" to "closed").

Block S250 can similarly function to lock the doors of the vehicle during a vehicle rental period once the user restores the upgraded ignition key to the key dock 180. However, Block S250 can function in any other way to trigger transmission of the vehicle lock command from the upgrade ignition key.

4. Application: Upgraded Ignition Key

Figure 7:
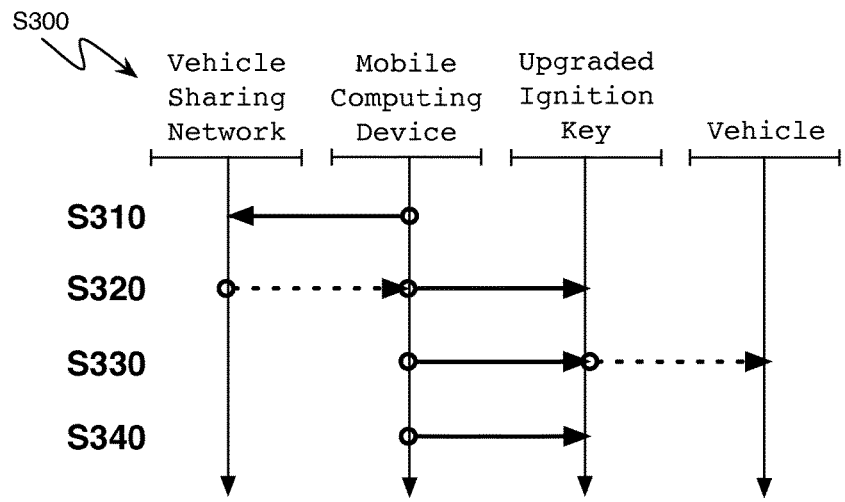
FIG. 7 is a flowchart representation of a third method of the invention.

As shown in FIG. 7, a third method S300 for sharing a vehicle includes: receiving a booking request for a vehicle rental by a user in Block S310; in response to authentication of the booking request, wirelessly pairing a mobile computing device with an ignition key associated with the vehicle in Block S320; and, in response to an unlock input into the mobile computing device, wirelessly transmitting a door unlock command from the mobile computing device to the ignition key in Block S330.

Generally, the third method S300 functions to enable a user to control the upgraded ignition key remotely via a mobile computing device (e.g., a smartphone, a tablet) to access the corresponding vehicle. In one use scenario, once the key is upgraded and installed in the vehicle, as described above in the first method S100, the user can walk up to the vehicle, book the vehicle with his smartphone (in Block S310), pair his smartphone with the upgraded key (in Block 320 via Block S220 of the second method S200), and unlocks the vehicle with the smartphone (in Block S330 via Block S230 of the second method S200). In this use scenario, the user can then enter the vehicle, take the upgraded ignition key from the key dock 180 on the vehicle's dashboard, and start the vehicle. During the rental period, the user can interface with the upgraded ignition key directly to lock and unlock the vehicle or communicate vehicle access commands to the upgraded ignition key through his smartphone to lock and unlock the vehicle.

Block S310 of the third method S300 recites receiving a booking request for a vehicle rental by a user. Generally, Block S310 functions to receive a booking request for the vehicle and to confirm the vehicle for rental to the user. For example, Block S310 can receive—through a native vehicle rental application executing on the user's smartphone—a request for any rental vehicle within a prescribed area or at a known location, the native vehicle rental application can transmit the request to the vehicle-sharing network, and the vehicle-sharing network can assign a specific vehicle to the vehicle or prompt the user to physically select a vehicle by walking up to a nearby vehicle, by entering a vehicle identifier (e.g., a fleet ID number or a license plate number) into the native vehicle rental application, or by selecting from a list of vehicles displayed within the native vehicle rental application. Once the vehicle is selected, Block S310 can receive a rental period or duration, rental start time, a rental end time, an anticipated travel distance during the rental period, and/or a number of passengers during the rental period, etc. from the user, such as through the native vehicle rental application executing on the user's smartphone. Block S310 can then assign the selected vehicle to the user and retrieve a personal user and billing information from the user's rental account (stored on the vehicle rental platform) or prompt the user to enter personal and billing information into the native vehicle rental application. (Block S310 can implement similar functionality through a web browser executing on the smartphone or on another computing device.)

Block S310 can additionally or alternatively implement methods and techniques described in U.S. patent application Ser. No. 13/788,836 to receive a booking request from the user and to book a vehicle for the user accordingly. However, Block S310 can function in any other way to receive and/or respond to a booking request for a vehicle rental for the user.

Block S320 of the third method S300 recites, in response to authentication of the booking request, wirelessly pairing a mobile computing device with an ignition key associated with the vehicle. Generally, Block S320 functions to interface with Block S220 of the second method S200 to establish and/or authenticate communication with the upgraded ignition key. For example, as described above, Block S320 can download a rolling code (i.e., a token) from the vehicle-sharing network onto the user's mobile computing device and transmit the rolling code from the mobile computing device to the upgraded ignition key to authenticate communication therewith. However, Block S320 can function in any other way to pair the user's mobile computing device with the upgraded ignition key.

Block S330 of the third method S300 recites, in response to an unlock input into the mobile computing device, wirelessly transmitting a door unlock command from the mobile computing device to the ignition key. Generally, Block S330 functions to interface with Block S230 of the second method S200 to unlock a door of the vehicle by transmitting a vehicle access request (i.e., a vehicle unlock request) to the upgraded ignition key, as described above. Block S330 can transmit the vehicle unlock request to the upgraded ignition key automatically once the user's mobile computing device and the upgraded ignition key are first paired and/or authenticated following confirmation of a vehicle rental for the user. Additionally or alternatively, Block S330 can transmit the vehicle unlock request to the upgraded ignition key in response to manual selection of an unlock request by the user (or affiliate therefore) into the mobile computing device.

In one implementation, the native vehicle-sharing application displays—on a screen of the mobile computing device—a digital representation of the physical vehicle access buttons of the vehicle's corresponding ignition key. The user can thus select a displayed virtual vehicle access button on the mobile computing device, and Block S330 can transmit a corresponding vehicle access request to the upgraded ignition key accordingly. Block S330 can therefore provide virtual controls on the user's mobile computing device to enable remote manipulation of stock vehicle access features of the ignition key through the mobile computing device. However, Block S330 can function in any other way to wirelessly transmit a door unlock command from the mobile computing device to the upgraded ignition key.

As shown in FIG. 7, one variation of the third method S300 includes Block S340, which recites transmitting an ignition authorization command from the mobile computing device to the ignition key to disable a wireless jammer within the ignition key. Generally, Block S340 functions to interface with Block S240 of the second method S200 to disable or deactivate the wireless jammer no within eh upgraded ignition key to thereby enable operation of the vehicle. In one implementation, Block S340 transmits the ignition authorization command as the rolling code or token transmitted to the upgraded ignition code in Block S320 (i.e., the upgraded ignition key can implement the authenticated rolling code or token to disable the wireless jammer no). Alternatively, Block S340 can transmit the ignition authorization command separately, such as in response to transmission of a door unlock request from the mobile computing device to the upgraded ignition key. Block S340 can also attach a time limit to the ignition authorization command, such as thirty seconds, five minutes, or the duration of the vehicle rental period, and the upgrade ignition key can deactivate the wireless jammer 110 until the time limit of the ignition authorization command expires, at which point Block S210—executing on the upgrade ignition key—can reactivate or re-enable the wireless jammer 110. However, Block S340 can function in any other way to transmit an ignition authorization command in any other way and of any other form to the upgraded ignition key.

5. Application: Upgraded Ignition Key and Dongle

Figure 8:
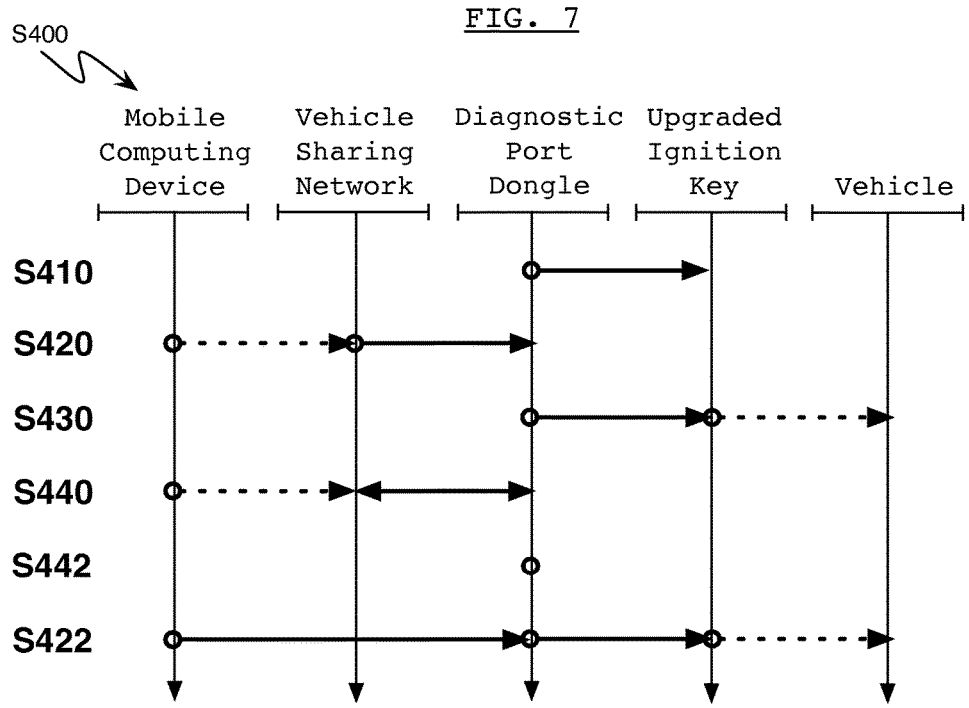
FIG. 8 is a flowchart representation of a fourth method of the invention.

As shown in FIG. 8, a fourth method S400 for sharing a vehicle includes: wirelessly pairing a diagnostic port dongle 190 arranged within the vehicle with an ignition key associated with the vehicle in Block S410, in a first mode, receiving a vehicle unlock request from a remote computer network in Block S420, and wirelessly transmitting a door unlock command to the ignition key arranged within the vehicle in Block S430, and, in a second mode, wirelessly pairing with a mobile computing device in Block S440, authenticating the mobile computing device in Block S442, receiving a vehicle unlock request from the mobile computing device in Block S422, and wirelessly transmitting a door unlock command to the ignition key arranged within the vehicle in Block S432.

Generally, the fourth method S400 functions to enable a user to control the upgraded ignition key remotely via a mobile computing device (e.g., a smartphone, a tablet) by routing vehicle access commands from the user's mobile computing device through the diagnostic port dongle 190 to the upgraded ignition key to access the corresponding vehicle. In particular, the fourth method S400 functions to selectively enable direct communication between the user's mobile computing device and the dongle 190 and indirect communication between the user's mobile computing device and the dongle 190 via a remote server (e.g., the vehicle-sharing network) based on wireless access to the remote server. For example, the dongle 190 can default to receiving communications from the user's mobile computing device via the remote server (or the native vehicle rental application executing the user's mobile computing device can default to communicating with the dongle 190 via the remote server), but the dongle 190 can resort to direct communication with the mobile computing device (or the mobile computing device can resort to direct communication with the dongle 190) if cellular communication is inaccessible and/or if cellular signal strength falls below a threshold value. The fourth method S400 can therefore select communication paths between the user's mobile computing device and the dongle 190 to achieve a desired level of security in light of immediacy of user access to the vehicle. For example, communication through the remote server can exhibit greater security than direct communication between the mobile computing device and the dongle 190 but communication between the dongle 190 and the mobile computing device may be required to provide immediate access to the vehicle if communication with the remote server is unavailable, impeded, or substantially reduced.

5.1 Block S410

Block S410 of the fourth method S400 recites wirelessly pairing a diagnostic port dongle 190 arranged within the vehicle with an ignition key associated with the vehicle. Generally, Block S410 can function like Block S320 to pair with the upgraded ignition key. For example, Block S410 can store a security algorithm, a unique key, and a counter identical to those stored on the upgraded ignition key and generate a new token for each communication (e.g., vehicle access request) transmitted to the upgraded ignition key, and the upgraded ignition key can authenticate each new token received from the dongle 190 as described above. Alternatively, Block S410 can download each new token from the vehicle-sharing network, such as over encrypted cellular communication protocol. However, Block S410 can function in any other way to wirelessly pair the diagnostic port dongle 190 with an ignition key.

3.2 First Mode

Block S420 of the fourth method S400 recites, in a first mode, receiving a vehicle unlock request from a remote computer network in Block S420. Furthermore, Block S430 of the fourth method S400 recites, in the first mode, wirelessly transmitting a door unlock command to the ignition key arranged within the vehicle. Generally, when communication with the remote server is supported, the fourth method S400 executes the first mode with Block S420 receiving vehicle access requests from a remote server and Block S430 interfacing with Block S220 and Block S230 of the second method S200 to communicate these vehicle access requests to the upgraded ignition key. For example, the dongle 190 can execute Blocks S420 and S430 when a cellular connection and/or Wi-Fi is supported within range of the dongle 190.

Like Block S320, Block S430 can authenticate communication with the upgraded ignition key, such as by generating a token based on a security algorithm, a unique code, and a counter stored locally on the dongle 190 and that match a security algorithm, a unique code, and a counter stored on the upgraded ignition key. Block S420 can further implement encryption and/or decryption methods to encrypt communications to and/or to decrypt communications from the remote server.

3.3 Second Mode

Block S440 of the fourth method S400 recites, in a second mode, wirelessly pairing with a mobile computing device, and Block S442 of the fourth method S400 recites, in the second mode, authenticating the mobile computing device. Furthermore, Block S422 of the fourth method S400 recites, in the second mode, receiving a vehicle unlock request from the mobile computing device, and Block S432 of the fourth method S400 recites, in the second mode, wirelessly transmitting a door unlock command to the ignition key arranged within the vehicle. Generally, Blocks S422, S430, S440, and S442 function to enable direct communication between the smartphone and the dongle 190 (e.g., if cellular or Wi-Fi communication proximal the vehicle is not supported), to receive vehicle access requests directly from mobile computing device, and to communicate these vehicle access requests to the upgraded ignition key.

In one implementation, Block S440 and Block S442 implement techniques similar to Block S220 of the second method S200 to pair the dongle 190 to mobile computing device and to authenticate communications therebetween. In this implementation, when the booking request is first received from the user via the mobile computing device, the native vehicle rental application and download a second security algorithm, a second unique code, and a second counter that are identical to a second security algorithm, a second unique code, and a second counter stored on the dongle 190 but which are only valid when communication between the dongle 190 and the vehicle rental network is severed, impaired, or intermittent. Thus, when the fourth method S400 executing on the dongle 190 transitions to the second mode, the second security algorithm, second unique code, and second counter can become valid, and the Blocks S440 and S442 can implement methods and techniques described above to pair the mobile computing device directly with the dongle 190 and to authenticate communications therebetween. For example, Block S440 can pair the dongle 190 with the mobile computing device over Bluetooth 2.0 wireless communication protocol and authenticate these communications based on a token received from and generated by the mobile computing device based on the second security algorithm, the second unique code, and the second counter.

Once communication between the mobile computing device and the dongle 190 is established in Block S440 and S442, Block S422 and S432 can implement methods and techniques similar to Block S330 of the third method S300 to transmit a vehicle unlock request to the upgraded ignition key.

However, Blocks S422, S432, S440, and S442 can function in any other way to establish, authenticate, and handle communications directly from the user's mobile computing device to the dongle 190 when wireless communication between the dongle 190 and a remote server is not severed, impaired, or intermittent to enable access to the vehicle through the mobile computing device.

6. Application: Upgraded Ignition Key, Dongle, and Card Reader

Figure 9:
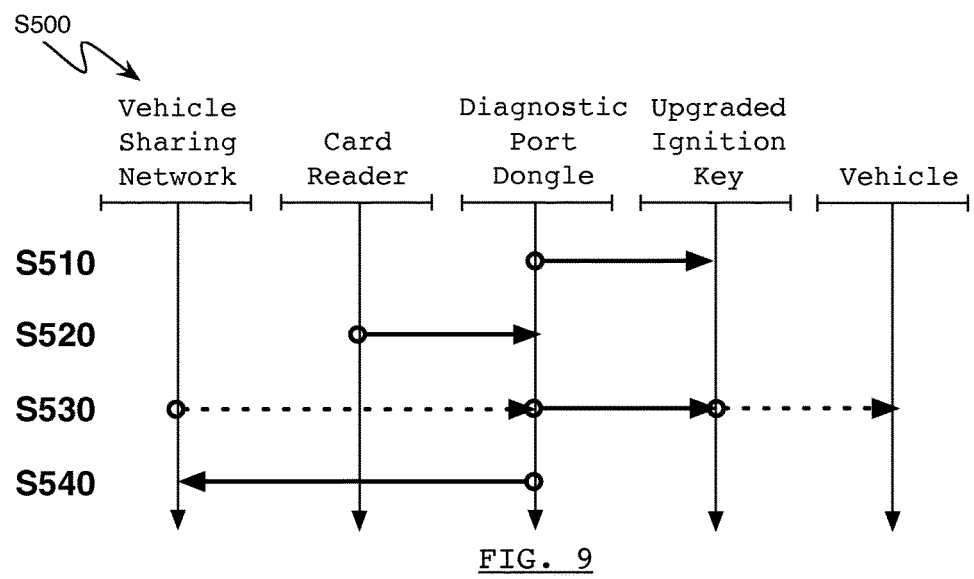
FIG. 9 is a flowchart representation of a fifth method of the invention.

As shown in FIG. 9, a fifth method S500 for sharing a vehicle includes: wirelessly pairing a diagnostic port dongle 190 arranged within the vehicle with an ignition key associated with the vehicle in Block S510, receiving a login request for a user through a card reader 192 coupled to the diagnostic port dongle 190 in Block S520; and, in response to authentication of the login request, wirelessly transmitting a door unlock command to the ignition key arranged within the vehicle in Block S530.

Generally, the fifth method S500 enables a user to rent the vehicle by tapping a badge or other identification card against a card (e.g., RFID) reader arranged inside the vehicle and coupled to the dongle 190, which communicated vehicle access requests to the upgraded ignition key.

Block S510 of the fifth method S500 recites wirelessly pairing a diagnostic port dongle 190 arranged within the vehicle with an ignition key associated with the vehicle. Generally, Block S510 can implement techniques and methods of Block S410 of the fourth method S400 to pair the dongle 190 with the upgraded ignition key and/or to authenticate communications therebetween.

Block S520 of the fifth method S500 recites receiving a login request for a user through a card reader 192 coupled to the diagnostic port dongle 190. Generally, Block S520 functions to extract user identifying information from a card or other wireless-enabled device proximal the card reader 192 and to transmit the user identifying information to a remote server (e.g., the vehicle-sharing network) to book the vehicle for rental to the user. For example, Block S520 can implement methods or techniques described in U.S. patent application Ser. No. 13/788,836 to book the vehicle for rent by the user based information downloaded wirelessly from the user identification card.

In one implementation, Block S520 powers an RFID transmitter and RFID reader within the card reader 192 to download data stored on the user's card when the user taps his wireless-enabled employee badge on the vehicle's windshield proximal the card reader 192, the dongle 190 communicates the downloaded information to the dongle 190 via a hard line behind an interior A-pillar cover within the vehicle (described above), and the dongle 190 encrypts and then transmits the downloaded information with an identifier of the vehicle to the remote server over a cellular connection. The remote server then decrypts the user identification information, retrieves a user profile and billing information from a user database based on the user identifying information, and books the vehicle for the user based on the received vehicle identifier. Subsequently, the remote server can return a booking confirmation to the dongle 190 over a cellular network, and the dongle 190 can handle the confirmed vehicle rental by executing Block S530.

However, Block S520 can collect user data locally at the vehicle and distribute these data to a remote server in any other suitable to confirm rental of the vehicle to the user.

Block S530 of the fifth method S500 recites, in response to authentication of the login request, wirelessly transmitting a door unlock command to the ignition key arranged within the vehicle. Generally, Block S530 implements methods or techniques described above in Block S330 of the third method S300 to communicate a vehicle unlock request to the upgraded ignition key to trigger transmission of a door unlock command from the upgraded ignition key to the vehicle. Once the vehicle is thus unlocked for the user responsive to a confirmed vehicle rental, the user can interface with the upgraded ignition key directly to control access to the vehicle and to start the vehicle. Additionally or alternatively, Block S320 and Block S330 can repeat to unlock the doors of the vehicle each time the user taps his card on the vehicle proximal the card reader 192 during the rental period. However, Block S530 can function in any other way to remotely control the upgraded ignition key to provide the user with access to the vehicle.

As shown in FIG. 9, one variation of the fifth method S500 includes Block S540, which recites wirelessly receiving diagnostic information of the vehicle from the card reader 192 module and transmitting the diagnostic information to a remote computer network. Generally, Block S540 function to transmit vehicle and related information collected by the dongle 190 through the vehicle's OBD port and/or by one or more sensors within the dongle 190 to the vehicle-sharing network. For example, Block S540 can transmit the vehicle and related data in real-time over cellular communication protocol. Alternatively, Block S540 can transmit select vehicle and related data to the vehicle-sharing network at the end of the rental period, such as over Wi-Fi if the vehicle is parked within range of an affiliated Wi-Fi router (e.g., a Wi-Fi affiliated with a corresponding vehicle rental agency) or over a cellular network if Wi-Fi communication is not supported proximal the vehicle. In particular, the dongle 190 can transmit vehicle-related data directly, such as over Wi-Fi communication protocol to a local router, over cellular communication protocol to a local cellular tower, or over Bluetooth communication protocol to a nearby and related vehicle (e.g., a vehicle within the same vehicle fleet). For example, the dongle 190 can network the corresponding vehicle with other nearby vehicles, such as to share vehicle and/or user-related data across a vehicle fleet. Alternatively, the dongle 190 can upload vehicle data to a user's mobile computing device (e.g., a smartphone), and the mobile computing device can pass the data to a remote server or computer network, such as over Wi-Fi, cellular, Bluetooth, or other wireless communication protocol. These data can then be implemented by the vehicle-sharing platform to bill the user, track vehicle usage and wear, manage vehicle maintenance, track rental vehicle fleet distribution (over time), etc. However, Block S540 can function in any other way to communicate vehicle and related information to a remote computer network.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. An improved ignition key, comprising:
   a stock ignition key, comprising a blade affixed to a stock housing, said stock housing comprising an immobilizer transponder; and
   an enclosure coupled to and containing the stock housing, but separable therefrom, said enclosure comprising a wireless jammer configured to intermittently interfere with wireless transmissions from the immobilizer transponder;
   wherein the improved ignition key functions as an access device to a corresponding vehicle for use in a shared vehicle service.

2. The improved ignition key of claim 1, said stock housing containing a keyless entry transmitter, and said enclosure containing a wireless receiver configured to receive an unlock request.

3. The improved ignition key of claim 1, said enclosure further containing a battery.

4. The improved ignition key of claim 1, said enclosure comprising a feature to engage a key dock.

5. The improved ignition key of claim 4, said enclosure containing a sensor configured to detect proximity of the key dock.

6. The improved ignition key of claim 5, said enclosure further comprising a visual indicator configured to display a visual signal in response to removal of the enclosure from the key dock.

7. The improved ignition key of claim 1, wherein the wireless jammer comprises a circuit comprising a conductive coil arranged adjacent to the immobilizer transponder.

8. The improved ignition key of claim 1, wherein the wireless jammer comprises a secondary wireless transmitter configured to output a secondary wireless signal substantially simultaneously with a primary wireless signal output by the immobilizer transponder.

9. The improved ignition key of claim 8, wherein the secondary wireless signal is of greater signal strength than a primary wireless signal.

10. The improved ignition key of claim 8, wherein the secondary wireless signal comprises an inverted digital key substantially canceling the primary wireless signal.

11. The improved ignition key of claim 8, wherein the secondary wireless signal comprises a pseudorandom signal substantially interfering with the primary wireless signal.

12. The improved ignition key of claim 1, wherein the wireless jammer comprises a shield configured to move to block a primary wireless signal output by the immobilizer transponder.

13. The improved ignition key of claim 12, wherein the shield comprises a tube.

14. The improved ignition key of claim 1, said enclosure further containing a motion sensor.

15. The improved ignition key of claim 14, wherein the wireless jammer is actuated in response to detected motion of the enclosure by the motion sensor.

16. The improved ignition key of claim 1, said enclosure further containing an orientation sensor.

17. The improved ignition key of claim 16, wherein the wireless jammer is actuated based on the detected orientation of the enclosure.

18. An improved ignition key,
a stock ignition key, comprising a blade affixed to a stock housing, and
an enclosure coupled to and containing the stock housing, said enclosure comprising a wireless jammer, a feature to engage a key dock, and a sensor configured to detect proximity of the key dock;
wherein the wireless jammer is actuated in response to removal of the enclosure from the key dock.

19. A method for converting a vehicle for use in a vehicle rental or sharing fleet, comprising the steps of:
obtaining a stock ignition key for a vehicle, said stock ignition key comprising a blade affixed to a stock housing, said stock housing containing an immobilizer transponder;
coupling an enclosure to the stock housing so that the enclosure contains the stock housing to produce an improved ignition key, wherein said enclosure further contains a wireless jammer configured to intermittently interfere with wireless transmissions from the immobilizer transponder, a wireless receiver, a processor, and one or more of a battery, a relay, or a sensor;
placing the improved ignition key in the vehicle; and
remotely enabling access by an authorized mobile computing device to said vehicle through a vehicle rental or sharing platform, without any vehicle make or model specific conversion equipment installed into the vehicle itself.

* * * * *